United States Patent

Fahey et al.

Patent Number: 5,855,290
Date of Patent: Jan. 5, 1999

[54] SWITCHGEAR AND ENCLOSURE THEREFOR

[75] Inventors: Phillip J. Fahey, Evanston; David H. Devonald, III, Green Oaks; Edmund S. Dizon, Chicago; John W. Estey, Glenview, all of Ill.

[73] Assignee: S&C Electric Company, Chicago, Ill.

[21] Appl. No.: 708,170

[22] Filed: Aug. 29, 1996

[51] Int. Cl.⁶ .................................................. B65D 11/00
[52] U.S. Cl. ............................................ 220/4.28; 220/4.02
[58] Field of Search ............................... 220/4.28, 4.31, 220/3.94, 4.02

[56] References Cited

U.S. PATENT DOCUMENTS

| | | | |
|---|---|---|---|
| 3,724,702 | 4/1973 | Kay | 220/4.02 |
| 3,727,785 | 4/1973 | Lutz | 220/4.28 X |
| 3,974,934 | 8/1976 | Rohner | 220/4.28 |
| 3,984,023 | 10/1976 | Hodas | 220/4.28 |
| 3,991,264 | 11/1976 | Connell | 220/3.94 X |
| 4,821,143 | 4/1989 | Holmgren et al. | 361/335 |
| 5,177,325 | 1/1993 | Giammanco | 220/4.02 X |

*Primary Examiner*—Steven M. Pollard
*Attorney, Agent, or Firm*—James V. Lapacek

[57] ABSTRACT

Switchgear is provided including an enclosure for pad-mounted installation. The enclosure includes large lift-up cover panels in combination with removable front panels so as to provide unobstructed access to the interior of the enclosure. In a preferred arrangement, the enclosure houses switchgear that includes low-voltage control and viewing arrangements that are operable from a first side of the switchgear and medium-voltage cable terminations that are accessible from a second side of the switchgear opposite the first side, the enclosure providing access to the low-voltage arrangements while providing isolation from the medium-voltage arrangements. The enclosure also includes protection from the environment in the area of the lift-up cover panels while also providing collapsible lifting members.

15 Claims, 14 Drawing Sheets

SWITCHGEAR AND ENCLOSURE THEREFOR

BACKGROUND OF THE INVENTION

1. Field of the Invention

The present invention relates generally to switchgear for the field of electrical power distribution, and more particularly to an enclosure for pad-mounted installation of switchgear to provide separate access to and isolation between medium-voltage cable termination arrangements and the low voltage control, testing and viewing provisions.

2. Description of the Related Art

Switchgear are generally categorized by their installation location (e.g. grade or surface, sub-surface etc.), the configuration of components (e.g. loadbreak switches, fuses, interrupters, disconnects, sectionalizers, etc.), the cable connections (e.g. elbows, cable terminators), the accessibility of components and controls, the medium within the switchgear enclosure, for example air, vacuum, oil, gas (such as $SF_6$), etc., and additional features such as fault indicators, voltage indicators, power operation, automatic fault interruption control, etc. Various enclosures for pad-mounted installations are known that provide security and access features for operation of the switchgear or components housed therein. For example, see U.S. Pat. Nos. 4,986,578, 4,489,966, and 3,572,062 for arrangements to secure access to pad-mounted gear.

While the enclosures of the prior art arrangements may be useful to provide certain useful operational features, the prior arrangements are rather limited regarding accessibility, ease of fabrication, and ease of operation for switchgear that is housed in a sealed tank and that includes arrays of low-voltage controls and viewing provisions of internal switch positions, and arrays of medium-voltage cable terminations. For example, the switchgear of U.S. Pat. No. 5,521,567 would be extremely useful for pad-mounted installations if suitable enclosures were available.

SUMMARY OF THE INVENTION

Accordingly, it is a principal object of the present invention to provide switchgear for pad-mounted installations including an enclosure having improved access features for operation which provide large areas of access and also isolates low-voltage control compartments from the medium-voltage termination compartments.

It is another object of the present invention to provide an enclosure for pad-mounted installation of switchgear that includes features for efficient fabrication while also providing desirable security, access, and environmental features.

It is a further object of the present invention to provide an enclosure for pad-mounted gear that houses a sealed switchgear tank and includes lift-up cover panels and removable panels for access to low-voltage control and viewing provisions with isolation from medium-voltage cable termination provisions of the switchgear, and further provides large degrees of open access to the medium-voltage cable termination provisions without obstruction.

It is yet another object of the present invention to provide security and environmental protection provisions for pad-mounted enclosures including lift-up cover panels.

It is a still further object of the present invention to provide an enclosure for pad-mounted gear that includes collapsible lifting tab provisions.

These and other objects of the present invention are efficiently achieved by the provision of an enclosure for pad-mounted installation having large lift-up cover panels in combination with removable front panels so as to provide unobstructed access to the interior of the enclosure. In a preferred arrangement, the enclosure houses switchgear that includes low-voltage control and viewing arrangements that are operable from a first side of the switchgear and medium-voltage cable terminations that are accessible from a second side of the switchgear opposite the first side, the enclosure providing access to the low-voltage arrangements while providing isolation from the medium-voltage arrangements. The enclosure also includes protection from the environment in the area of the lift-up cover panels while also providing collapsible lifting members.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
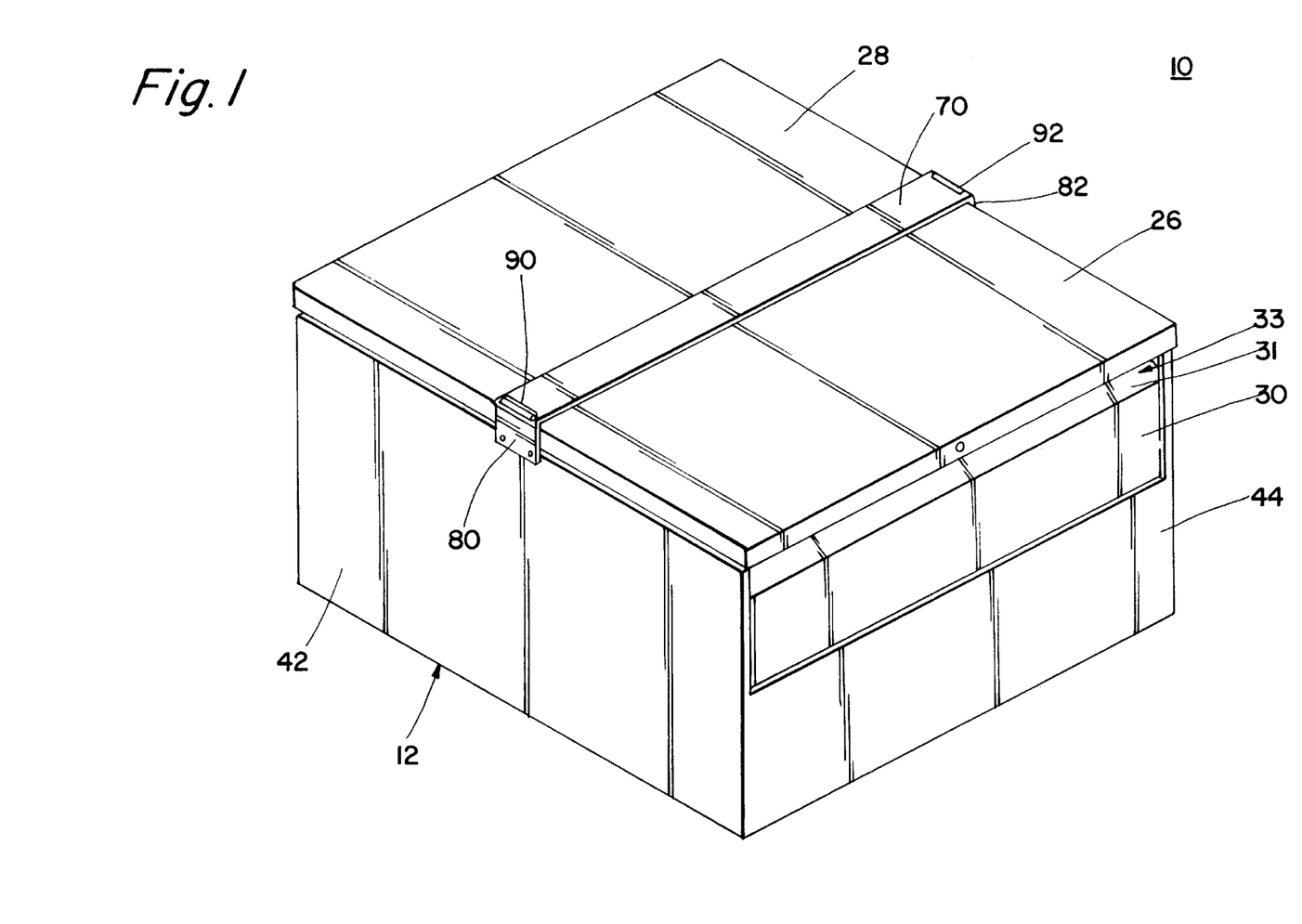
FIG. 1 is a perspective view of the switchgear of the present invention for pad-mounted installation.
Figure 2:
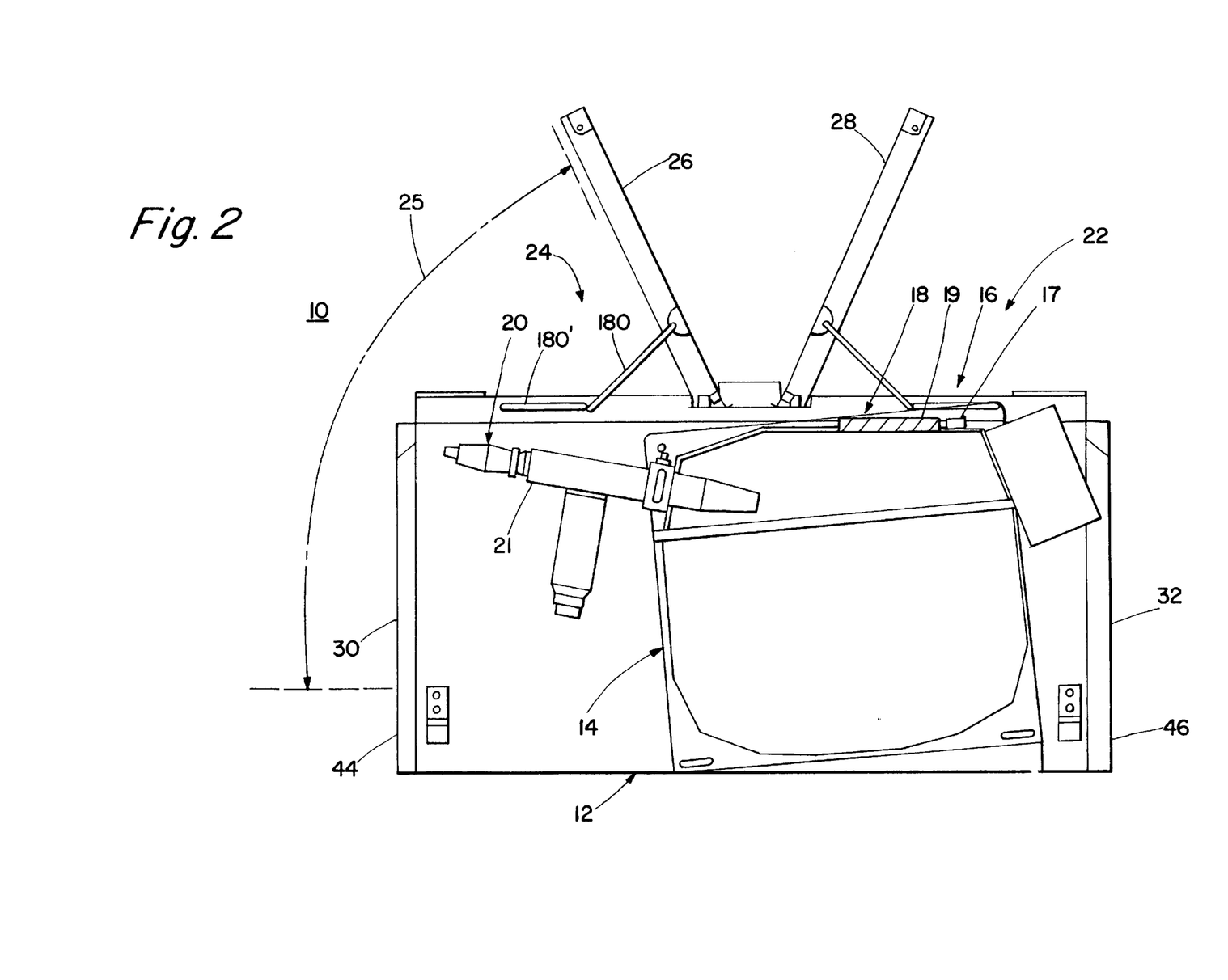
FIG. 2 is a right-side elevational view of the switchgear of FIG. 1 with parts removed for clarity.

Referring now to FIGS. 1–5, the switchgear 10 of the present invention is a self-contained structure designed for outdoor use and includes a self-supporting enclosure 12 for pad-mounted installation. The enclosure 12 is suitable for housing a variety of switchgear configurations, providing desirable security, access and structural integrity features. In a specific embodiment as illustrated in FIG. 2, the enclosure 12 houses a switchgear tank 14, which in an illustrative embodiment is a sealed switchgear assembly, for example of the type shown in co-pending application Ser. Nos. 08/653, 176 filed in the names of B. B. McGlone et al on May 24, 1996 and (attorney docket reference Case SC-5270).

Figure 3:
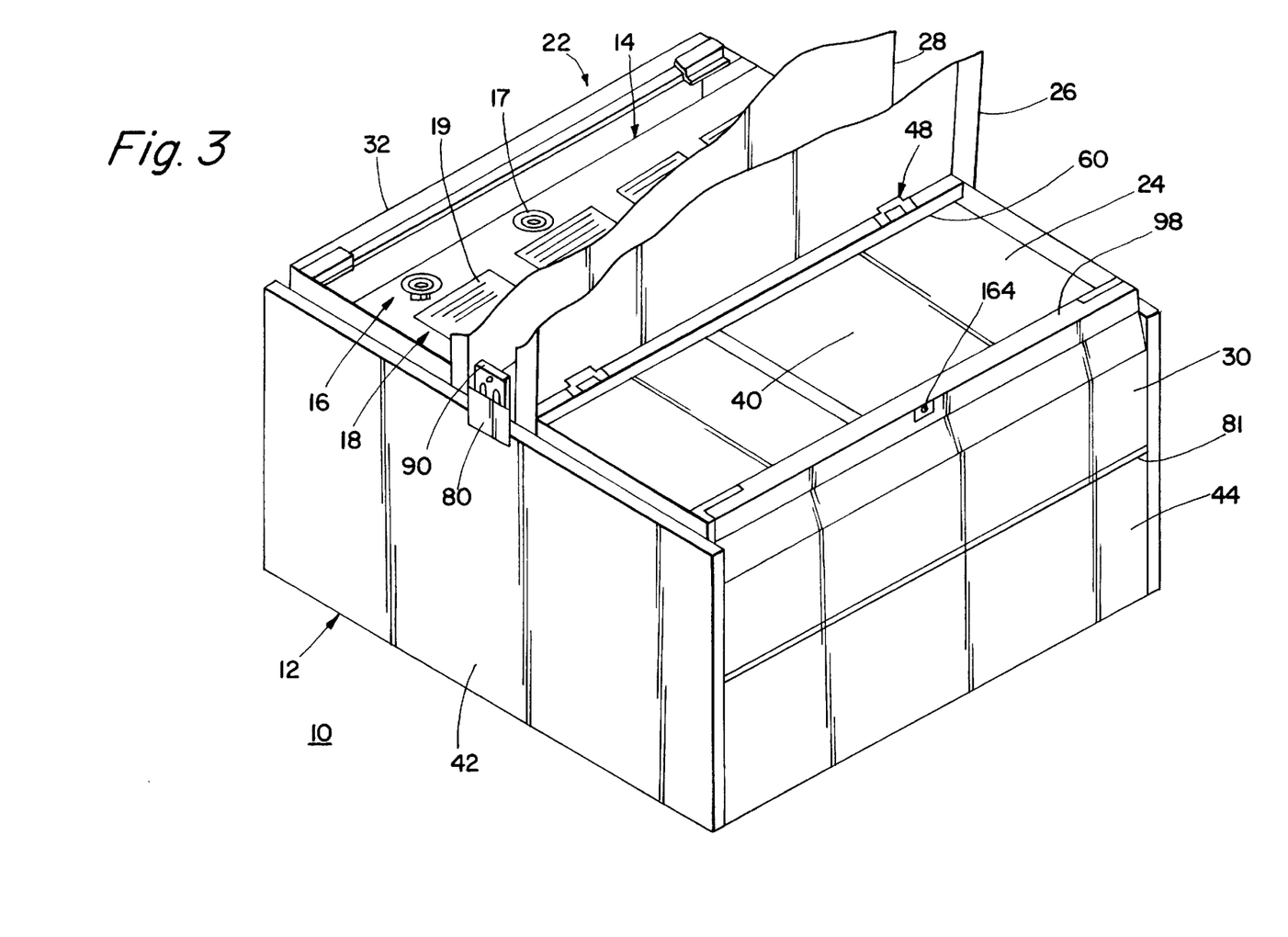
FIG. 3 is a perspective view of the switchgear of FIG. 1 with lift-up cover panels in the open position.
Figure 5:
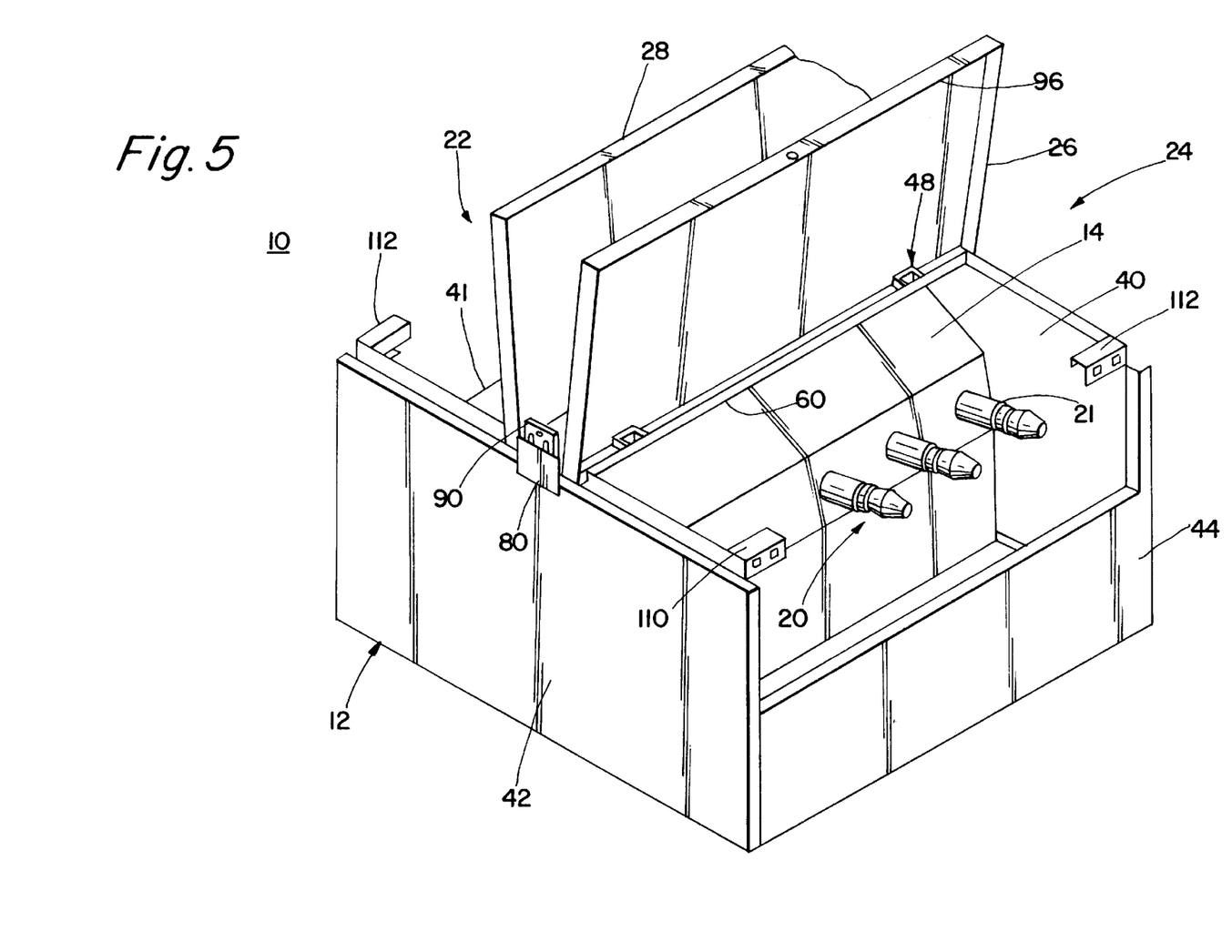
FIG. 5 is a perspective view of the switchgear of FIGS. 1–4 illustrating access to a medium-voltage compartment.

The switchgear tank 14 contains various electrical and mechanical components and is capable of being configured in a variety of circuit configurations to provide desirable operating features in an electrical power distribution system. Specifically, the switchgear tank 14 of FIG. 2 includes a control panel having an array 16 of low-voltage control arrangements 17 and an array 18 of viewing windows 19 for viewing of the operational status of switches contained within the tank 14. The switchgear tank 14 also includes an array 20 of termination arrangements 21 for medium-voltage electrical cables. In accordance with important aspects of the present invention, the enclosure 12 includes access features for operation which provide large degrees of access and also isolates a low-voltage operating compartment 22 (FIGS. 2, 3 and 5) from a medium-voltage termination compartment 24 (FIGS. 2, 3 and 5).

Specifically, the enclosure 12 includes lift-up cover panel arrangements and removable panel arrangements. For example, in an illustrative embodiment, lift-up cover panels 26 and 28 and removable panels 30 and 32 are provided. As illustrated, the lift-up cover panel 28 and the removable panel 32 provide access to the low-voltage operating compartment 22 which in the illustrative example houses the array 16 of low-voltage control arrangements 17 and the array 18 of viewing windows 19 with isolation from the medium-voltage compartment 24 housing the cable termination arrangements 20 of the switchgear tank 14. The cover panel 26 and the removable panel 30 provides large degrees of open access to the array 20 of medium voltage termination arrangements 21 for handling these terminations and the attached cables via working tools, e.g. shotgun sticks or the like, free of obstruction. For example, with the cover panel 26 in the open position of FIG. 2 and with the removable panel 30 removed, unobstructed access is available to the medium-voltage compartment 24 over large areas and angles of approach generally referred to at 25 in FIG. 2.

The enclosure 12 is defined by upstanding sidewalls, e.g. in the specific illustration of FIGS. 1–5, opposed sidewall panels 40, 42 spanned by structural panels or members 44, 46 along the front and back sides of the enclosure 12. The lift-up cover panels 26, 28 are pivotally mounted via hinges 48 with respect to a support member 60 (FIGS. 3, 5) which spans the sidewalls 40, 42, and assists in providing strength and rigidity to the overall enclosure 12. In accordance with important aspects of the present invention, a central cap member 70 (FIG. 1) is located above the support member 60 and also spans the sidewalls 40, 42. As will be explained in more detail hereinafter, the cap member 70 functions to shield the support member 60 and the interior of the switchgear 10 from precipitation while the support member 60 is arranged to divert and direct rain or the like out to the sides of the switchgear 10 and away from the interior of the switchgear 10. Additionally, and in accordance with additional important aspects of the present invention, the cap member 70 also includes side members 80, 82 and cooperates with tab members 90, 92 to provide a collapsible lifting arrangement for use in lifting and moving the pad-mounted switchgear 10, which can also be characterized as a retractable arrangement and will be described in more detail hereinafter.

Turning now to a more detailed discussion of the access features of the switchgear 10, the lift-up cover panels 26, 28 interfit and cooperate with the removable panels 30, 32 respectively to selectively provide access to the interior of the enclosure 12 and to the features of the switchgear tank 14. The lift-up cover panels 26, 28 secure the panels 30, 32 respectively such that the panels 30, 32 are secured in place until the respective lift-up cover panel 26, 28 is lifted clear of the respective removable panel 30, 32.

Figure 4:
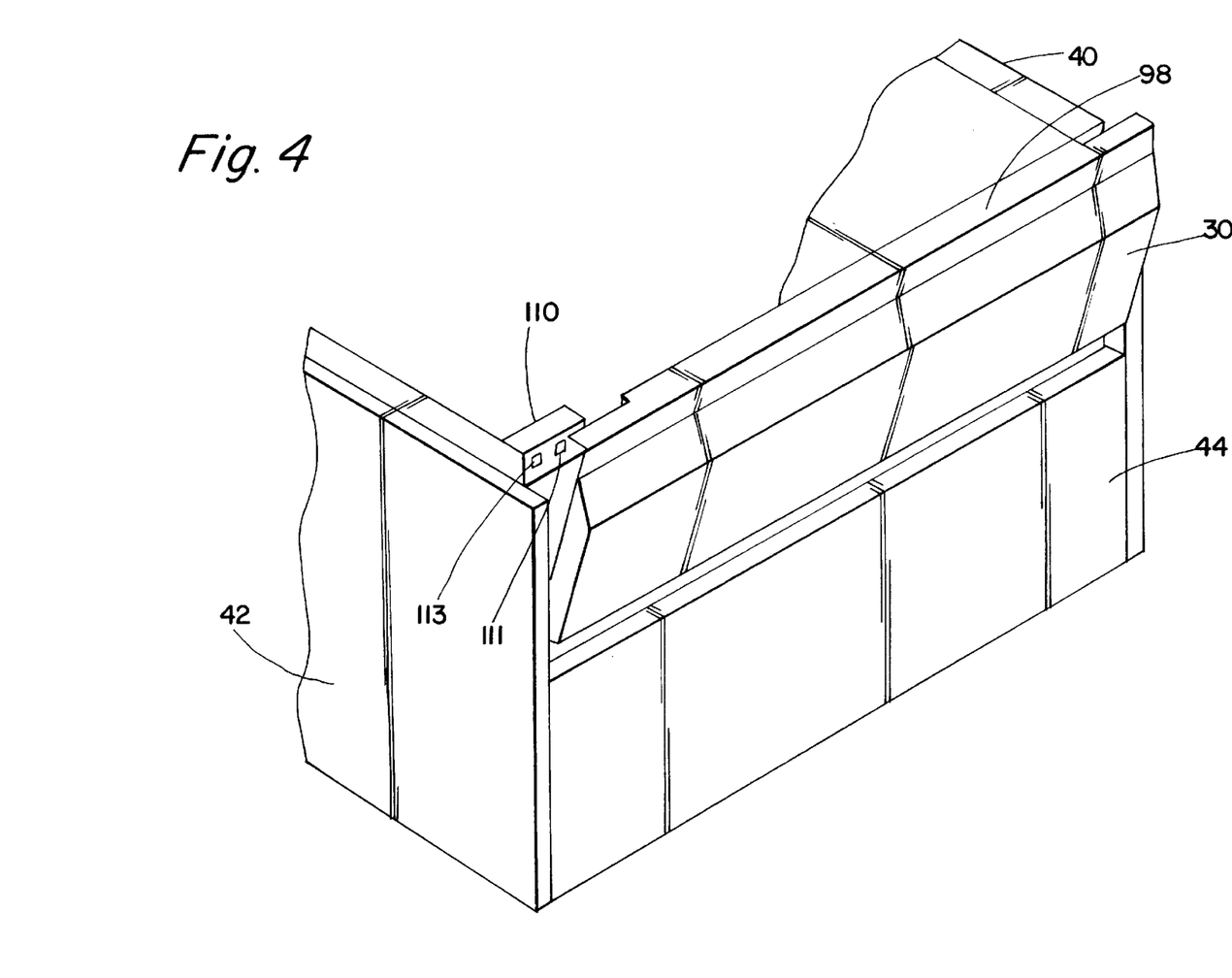
FIG. 4 is a partial perspective view of the switchgear of FIGS. 1–3 illustrating operation of a removable panel.
Figure 6:
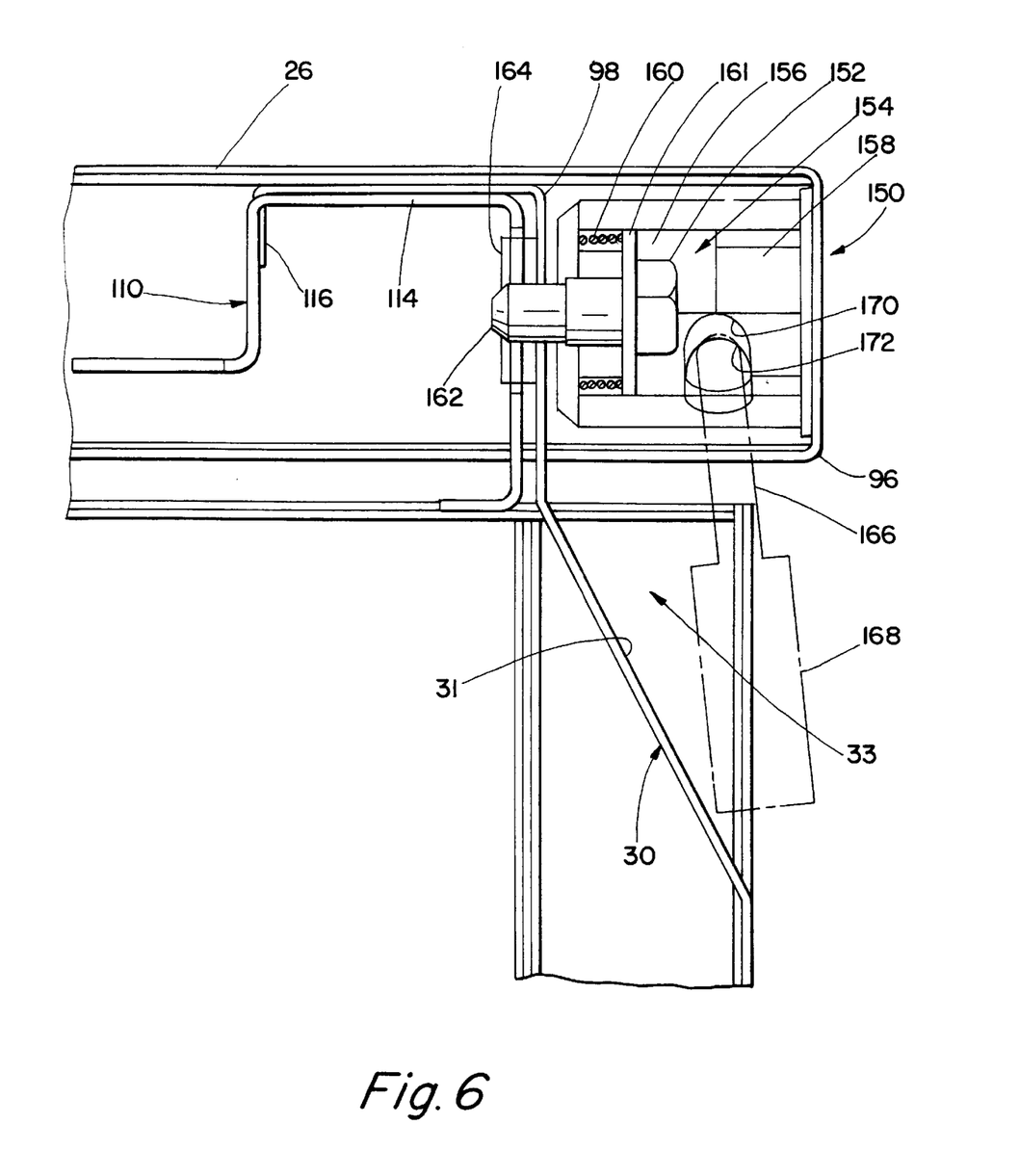
FIG. 6 is a partial left-side elevational view of the switchgear of FIG. 1 with parts cutaway for clarity and partly in section illustrating structure of the lift-up cover panel and the removable panel.
Figure 7:
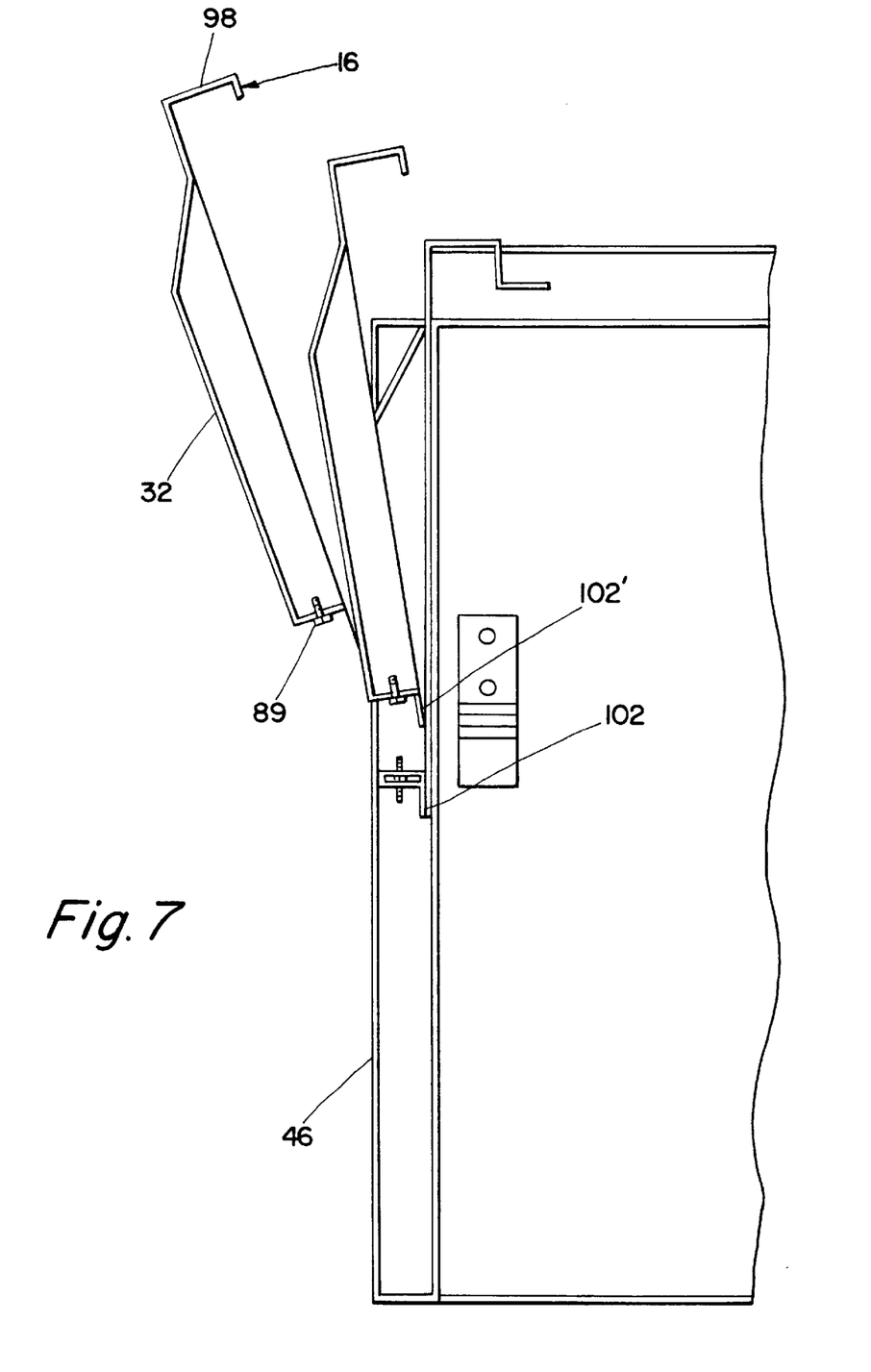
FIG. 7 is a partial left-side elevational view of the switchgear of FIG. 1 illustrating operation of the removable front panel.

In the specific embodiment of FIGS. 1–5 and with additional reference to FIGS. 6 and 7, the turned edge 96 of the cover panels 26, 28 overhangs and traps the top edge 98 of the panels 30, 32 as seen in FIGS. 1 and 6. Further, a lower edge 102 of the panels 30, 32 in the form of a lip interfits and is trapped behind the members 44, 46, as shown in FIG. 7. When the cover panel 26, 28 is lifted clear of the respective panel 30, 32, as shown in FIG. 3, the panel 30, 32 may then be lifted out and away from the enclosure 12 as shown in FIGS. 4 and 7. As seen in FIG. 5, when the panels 30, 32 are removed, the top and front surfaces to the enclosure 12 are unobstructed over a wide area with only the top rail portions 110, 112 protruding from the sidewalls 42, 20 respectively. As seen in FIGS. 3, 4 and 6, the top edge 98 of the panels 30, 32 is supported by the top edge 114 of the top rail portions 110, 112. In this regard, the top edge 98 of the removable panels 30, 32 includes a turned down edge or flange at 116 except in the areas of the top rail portions 110, 112 to provide additional structural rigidity and support to the enclosure 12 and the panels 30, 32 when the panels 30, 32 are in their normally closed positions. Accordingly, with the lift-up cover panels 26, 28 in the open position and the panels 30, 32 removed, open access to the interior of the enclosure 12 is provided over a wide range from the top and front as shown in FIG. 5.

Of course it should be understood that in the use of the switchgear of the present invention with the illustrative switchgear tank 14 housed therein, access is provided to the low-voltage operating compartment 22 as shown in FIG. 3 merely by lifting the cover panel 28 and the panel 32 need not be removed for operation of the controls 17 and use of the viewing windows 19. Further, the cover panel 26 to the medium voltage compartment 24 may be left in the closed position as shown in FIG. 1. Thus, the operator is not exposed to any components of the medium voltage compartment 24.

Figure 19:
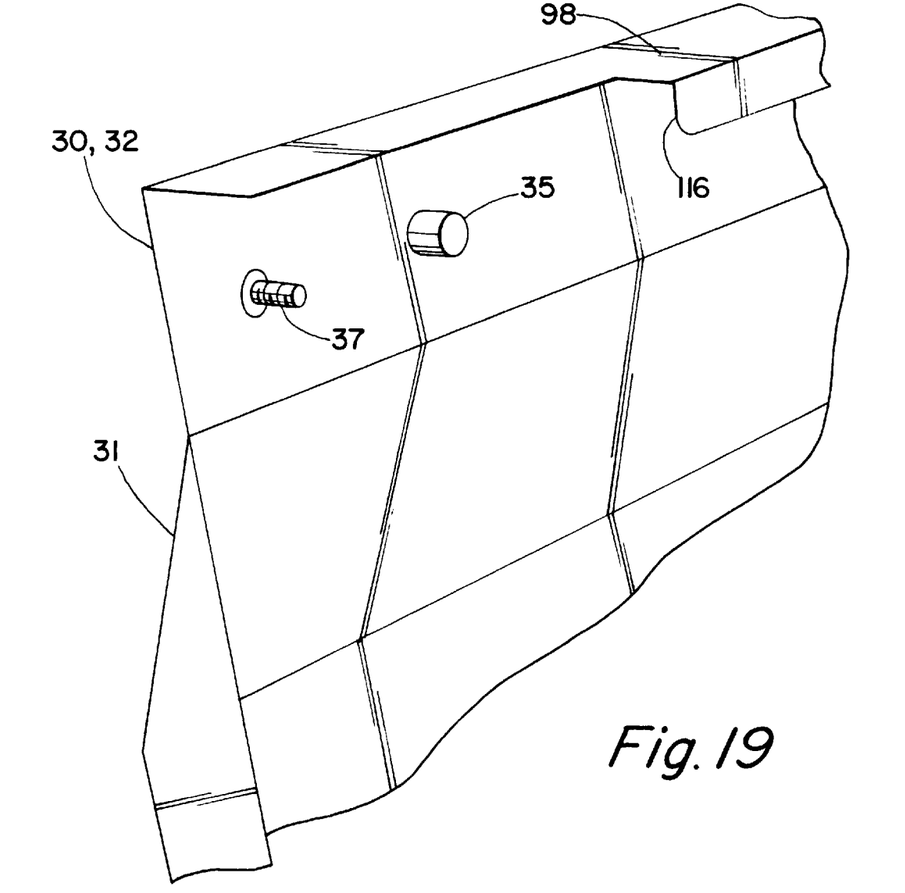
FIG. 19 is a partial perspective view of a removable panel of the switchgear of FIGS. 1–18.

Referring now additionally to FIG. 19, the removable panels 30, 32 include a section 31 that slopes inwardly so as to create a recess 33 (FIG. 6) in combination with the lift-up covers 26, 28 respectively where the lift-up covers 26, 28 overhang the removable panels 30, 32 at the top edge 98. In this manner, space is created for a security latch assembly 150 (FIG. 6) and additionally, the recess 33 creates a convenient access to the underside of the lift-up covers 26, 28 for an operator to grasp and raise the lift-up covers. In this regard, the removable panels 30, 32 include a pin 35 (FIG. 19) at each end which extends inwardly toward the enclosure 12 and which is received by an aperture 111 (FIG. 4) of the top rail portions 110, 112. This retains the removable panels 30, 32 from being lifted when the lift-up panels 26, 28 are in place. Additionally, the removable panels 30, 32 also include a threaded retainer 37 (FIG. 19) which is threaded into threaded sleeve 113 (FIG. 4) of the top rail portions 110, 112. This further restrains the removable panels 30, 32 from movement even after the lift-up covers 26, 28 have been raised so as to free the removable panels 30, 32.

Figure 20:
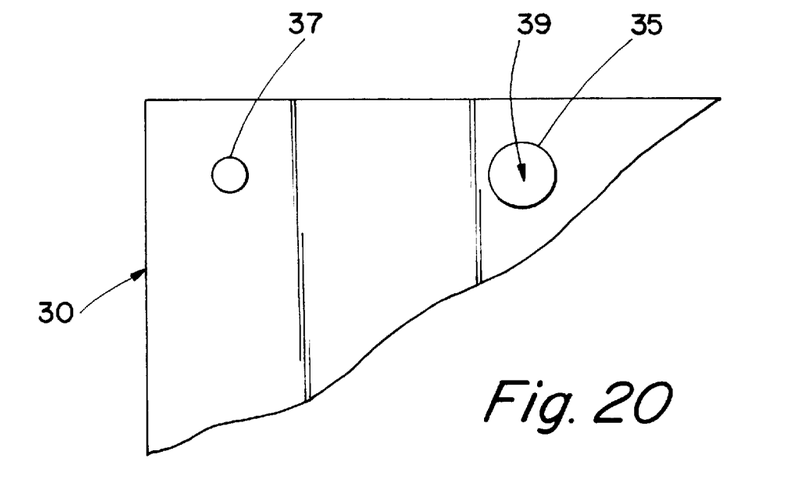
FIG. 20 is a diagrammatic view of one of the removable panels of the switchgear of FIGS. 1–19.
Figure 21:
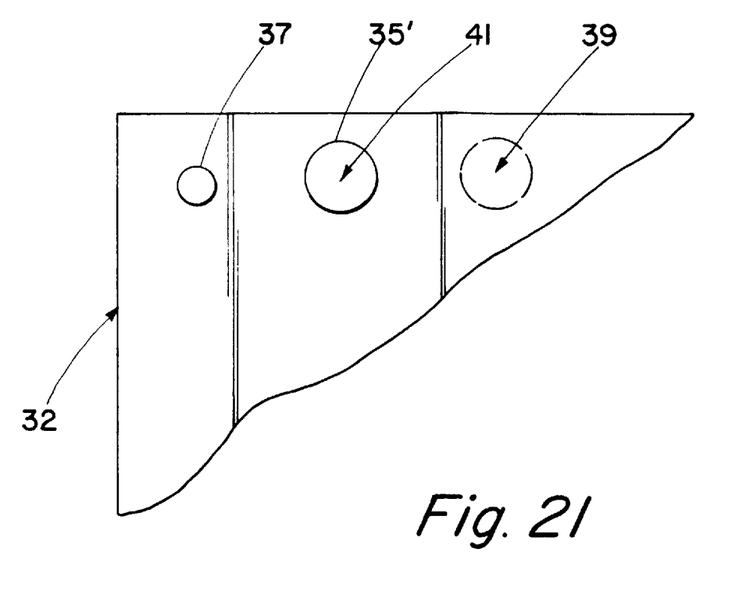
FIG. 21 is a diagrammatic view of a second of the removable panels of the switchgear of FIGS. 1–19.

In a preferred embodiment, and referring additionally now to FIGS. 20 and 21, the panels 30, 32 are rendered non-interchangeable with each other on the switchgear 10. For example, as seen in FIG. 20, the panel 30 includes the pin 35 at a first location 39 on the removable panel 30, while as seen in FIG. 21, the removable panel 32 includes a pin 35' at a different location 41. Similarly, the apertures 111 are suitably arranged for each of the pin 35, 35' at respective locations 39, 41. The non-interchangeable feature is useful, where, for example, different labeling, instructions etc. are provided on each of the removable panels 30, 32.

Figure 22:
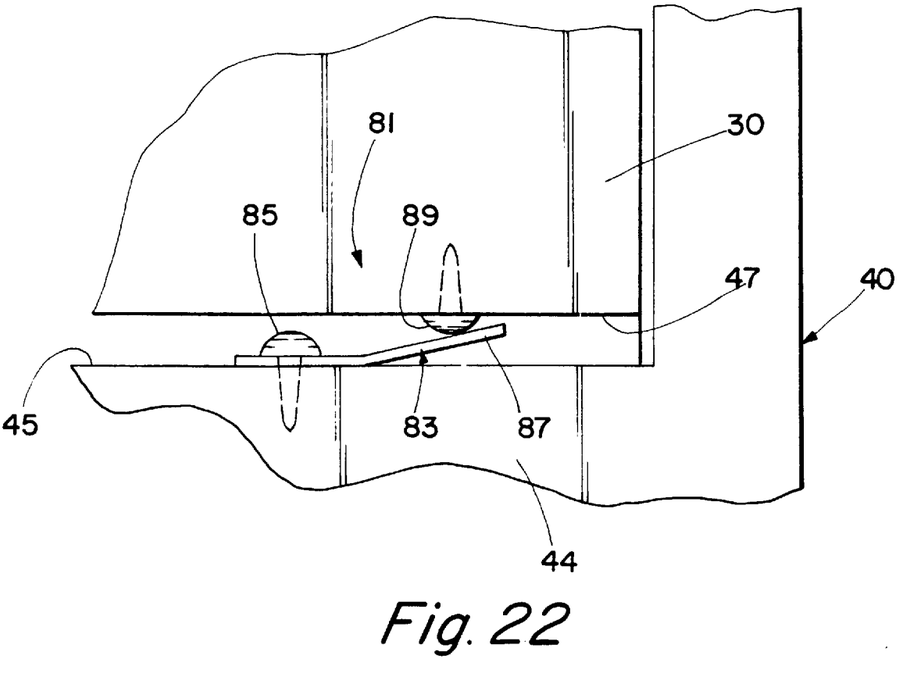
FIG. 22 is an enlarged, partial front elevational view of FIG. 1 illustrating a grounding arrangement for the removable panel.

With additional reference now to FIG. 22, a grounding arrangement 81 (location in FIG. 3) is provided for the removable panels 30, 32. For example, in a specific embodiment, a conductive spring plate 83 is secured to the top edge along the top edge 45 of each of the members 44, 46 via a self-tapping screw 85. This provides a suitable enclosure ground at the conductive spring plate 83. A self-tapping screw 89 (also seen in FIG. 7) is affixed to the lower edge 47 of the removable panels 30, 32. Thus, with the removable panel 30, 32 in place, a suitable ground is provided by the wiping contact between the conductive spring plate 83 and the head of the screw 89. The conductive spring plate 83 in a specific embodiment is fabricated from 0.025 inch thickness stainless steel with approximate dimensions of 2.5 inches along the edges 45 and 47 and 1.5 inches transverse thereto. The conductive spring plate 83 is also fabricated so as to extend at an angle sufficient to contact the screw 89 and establish suitable contact force accounting for the maximum clearances between the edges 45, 47, i.e. the angle of the portion 87 of the spring plate 83 is selected so as to be greater than the maximum angles encountered during operating conditions to contact the screw 89 and provide suitable contact force to establish a suitable ground to the enclosure 12 via the conductive spring plate 83, the screw 85 and the members 44, 46. A suitable angle for the fabrication of the portion 87 of the conductive spring plate 83 has been found to be 15 degrees, the dimensions in FIG. 22 being somewhat enlarged for illustration.

Figure 8:
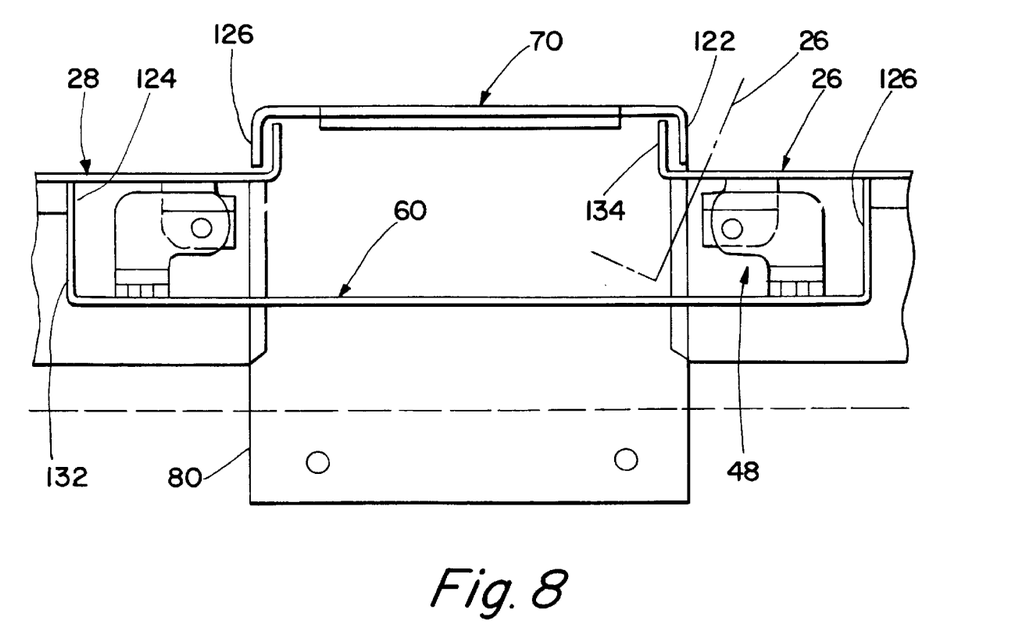
FIG. 8 is an enlarged partial left-side elevational view of the switchgear of FIG. 1 with parts removed and cutaway.
Figure 9:
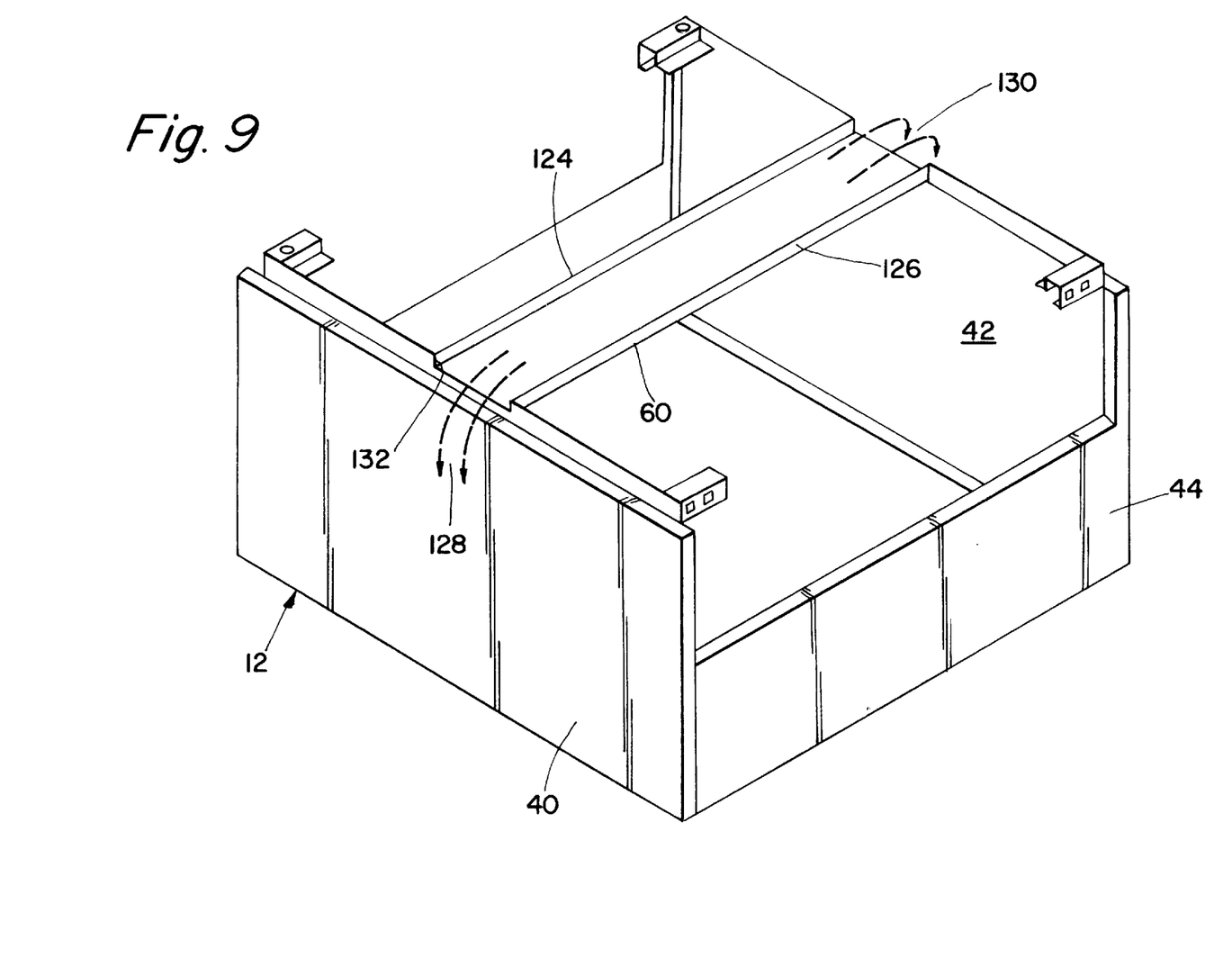
FIG. 9 is a perspective view of the switchgear of FIG. 1 with parts removed for clarity illustrating protective features of the present invention.
Figure 10:
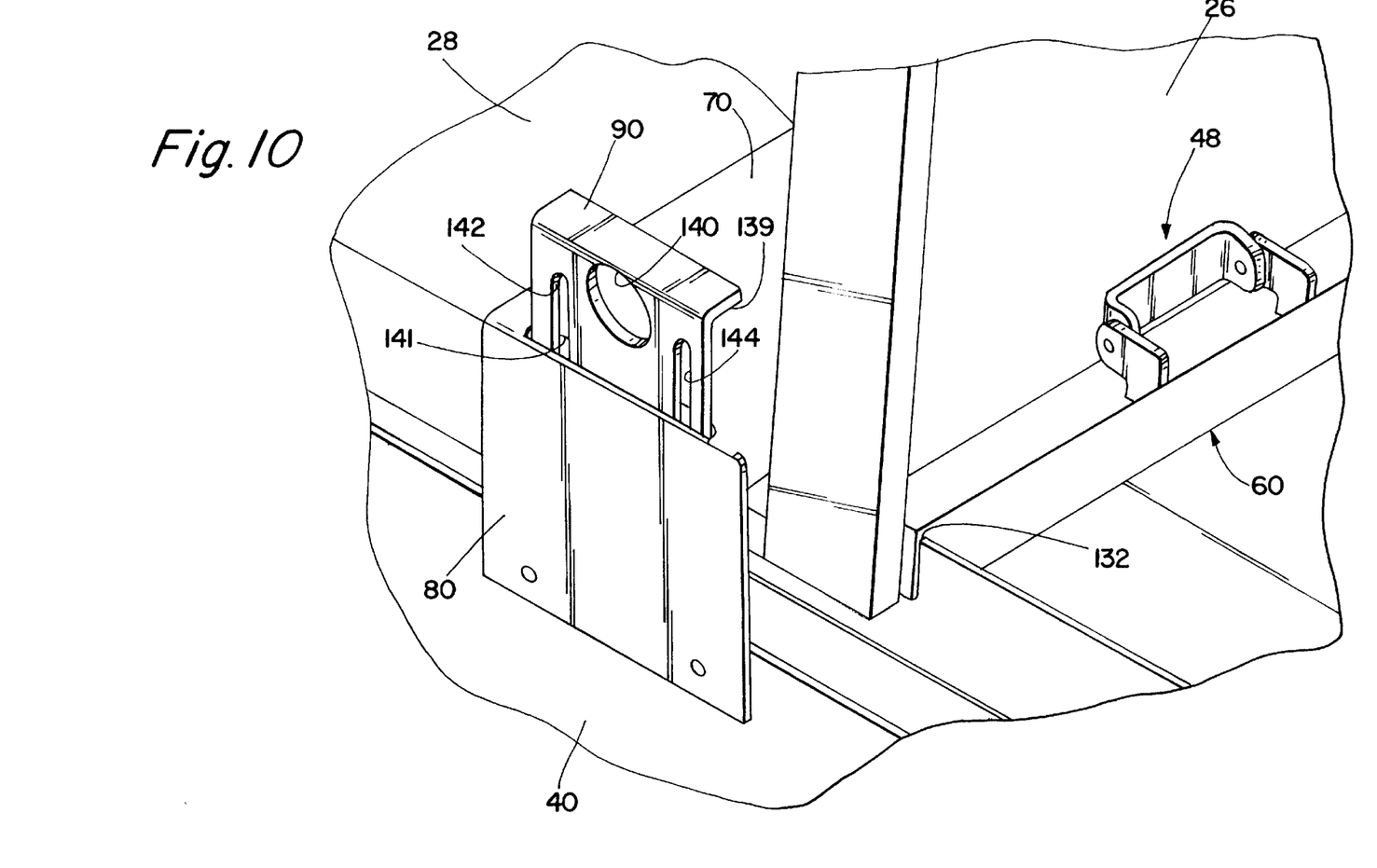
FIG. 10 is an enlarged perspective view of portions of the switchgear of FIG. 3 to better illustrate the features of the present invention.

Turning now to a more detailed discussion of the provisions of the present invention to prevent the entry of precipitation and the like from ingress to the switchgear 10 in the vicinity of the hinge areas at 48 of the lift-up cover panels 26, 28 and referring additionally now to FIGS. 8–10, the central cap member 70 is dimensioned to overlie portions of the cover members 26, 28 and includes downwardly turned edges to form flanges 120, 122 so as to function as a hood or protective member over the areas of the hinges 48 and the central portions of the interior of the enclosure 12, thus serving to help prevent the ingress of precipitation and the like. Further, for the situations where some precipitation may enter around the central cap member 70, the member 60 functions to support the hinges 48 of the lift-up cover panels 26, 28 and further includes turned up side edges that form flanges 124, 126 so as to function as a directing and diverting channel or gutter. As shown in FIG. 9, any precipitation or the like entering the member 60 is directed out to the sides of the enclosure 12 and down the exterior of the enclosure 12, as referred to at 128, 130. To this end, the sidewalls 40, 42 include slotted portions 132 at the center of the top edges thereof. To aid in preventing the ingress of precipitation etc., the cover panels 26, 28 include upwardly turned edges forming flanges 134, the cover 26 in the open position being shown at 26' in FIG. 8. The flange 134 functions to prevent ingress to precipitation and other objects in both the open and closed positions of the cover panel 26, with any precipitation caught in the areas of the flange 134 being directed out to the sides of the enclosure 12.

Figure 11:
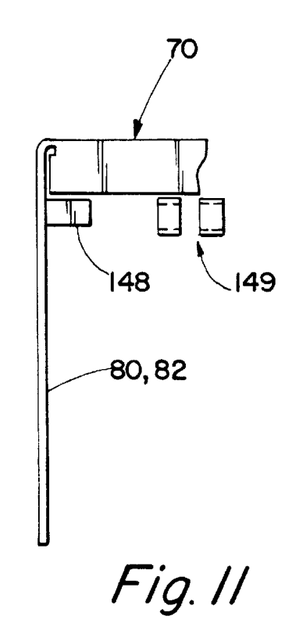
FIG. 11 is a partial right-side elevational view of FIG. 8 with parts removed for clarity.
Figure 12:
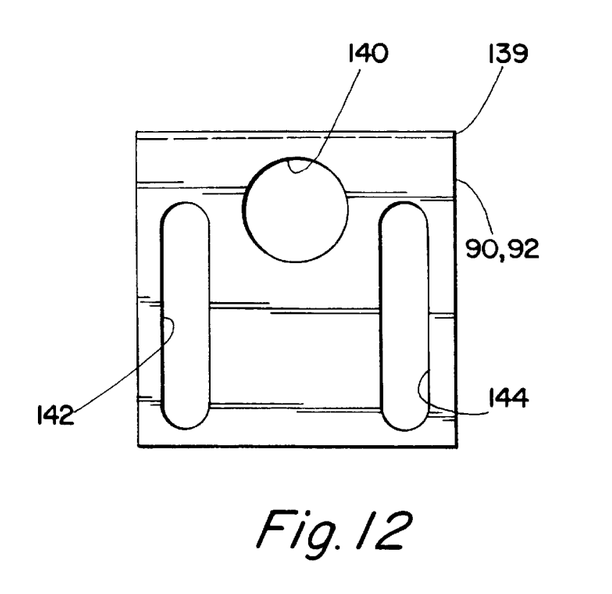
FIG. 12 is a front elevational view of a collapsible lifting member of the switchgear of FIGS. 1–11.
Figure 13:
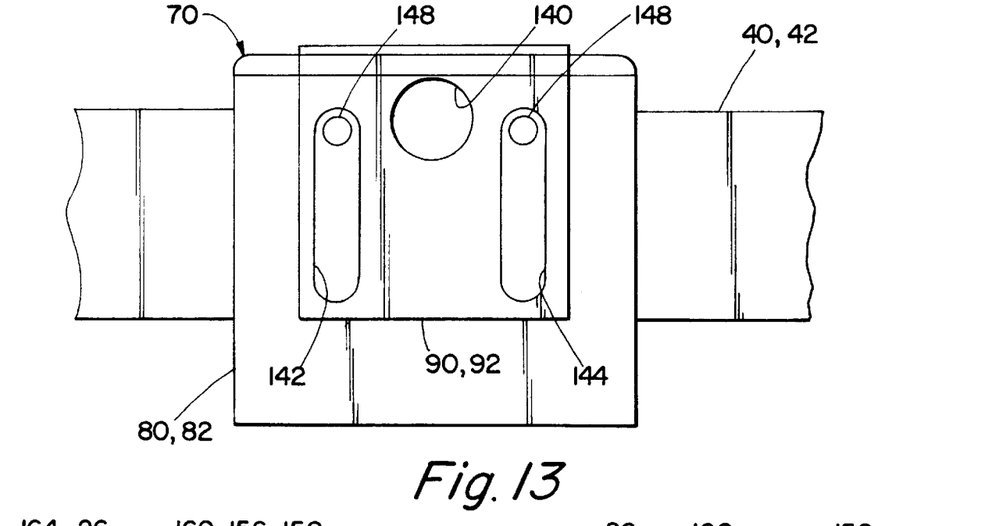
FIG. 13 is a diagrammatic representation of the assembly and interaction of the features of FIGS. 8 and 10–12 regarding collapsible lifting features.

In accordance with additional important aspects of the present invention, and referring additionally to FIGS. 11–13, the collapsible lifting arrangement is provided by the tab members 90, 92 which are slidable between extended and retracted positions within the respective side members 80, 82 of the central cap member 70 via openings 141 (FIG. 10) between the side members 80, 82 and the central cap member 70. The extended position of the lifting tab members 90, 92 is shown in FIGS. 3, 5 and 10 and the retracted position is shown in FIGS. 1 and 13. The lifting tab members 90, 92 include a turned edge forming a grasping flange 139 by which the lifting tab members may be raised to their extended position by an operator and a lifting hole 140. As best seen in FIG. 11, the side members 80, 82 of the central cap member 70 include pins 146 (FIG. 13), 148 which are received within slots 142, 144 of the lifting tab members 90, 92 (best seen in FIG. 12) for guiding the lifting tab members 90, 92 between the extended and retracted positions. Retention hardware 149 is also provided to retain the tab members 90, 92 on the pins 146, 148 and provide appropriate alignment and guidance.

Figure 14:
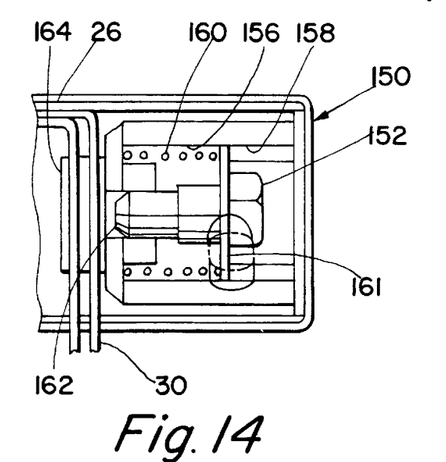
FIGS. 14 and 15 are enlarged, partial left-side elevational views; similar to FIG. 6 and illustrating operation of the switchgear.
Figure 15:
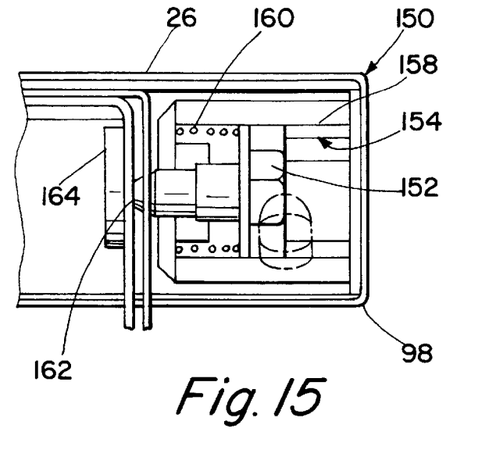
Figure 16:
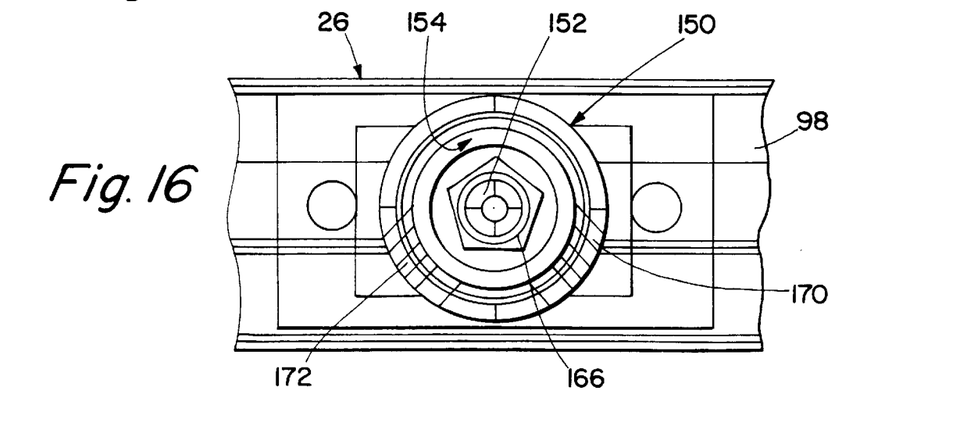
FIG. 16 is an enlarged, partial front elevational view of the switchgear of FIG. 1.

Considering now in more detail the security and access provisions of the present invention, and referring now to FIG. 6 and additionally to FIGS. 14–16, the security latch assembly 150 is carried by the lift-up cover panels 26, 28 and which is actuated via a penta-head bolt 152. The latch assembly 150 includes a cylindrical well portion 154 with inner sidewall 156 and a shoulder 158. The penta-head bolt 152 is biased outwardly via a spring 160 and retained by a collar 161 acting against the shoulder 158. An extending portion 162 of the penta-head bolt 152 moves to engage an aligned, threaded sleeve 164 carried by the removable panels 30, 32. In the engaged position of FIG. 6, a shackle 166 of a lock 168 may be inserted through apertures 170, 172 of the sidewall 156 of the well portion 154, whereupon the shackle 166 blocks access to the penta-head bolt 152.

With reference to FIG. 14, the latch assembly 150 is shown in the disengaged position in which the lift-up panel 26 is capable of being lifted to the open position since the penta-head bolt 152 is not engaging the removable panel 26. To engage the latch assembly 150, as shown in FIG. 15, the penta-head bolt 152 is moved inwardly via a penta-head socket tool (not shown) and turned one or more revolutions to engage the threaded sleeve 164 of the removable panel 30 whereupon the penta-bolt moves to the fully engaged position of FIG. 6. Note that in partially engaged position of FIG. 15, the shackle of a lock may not be inserted and locked, such that the latch assembly 150 requires fully engaged operation and position before the lock can be inserted.

Figure 17:
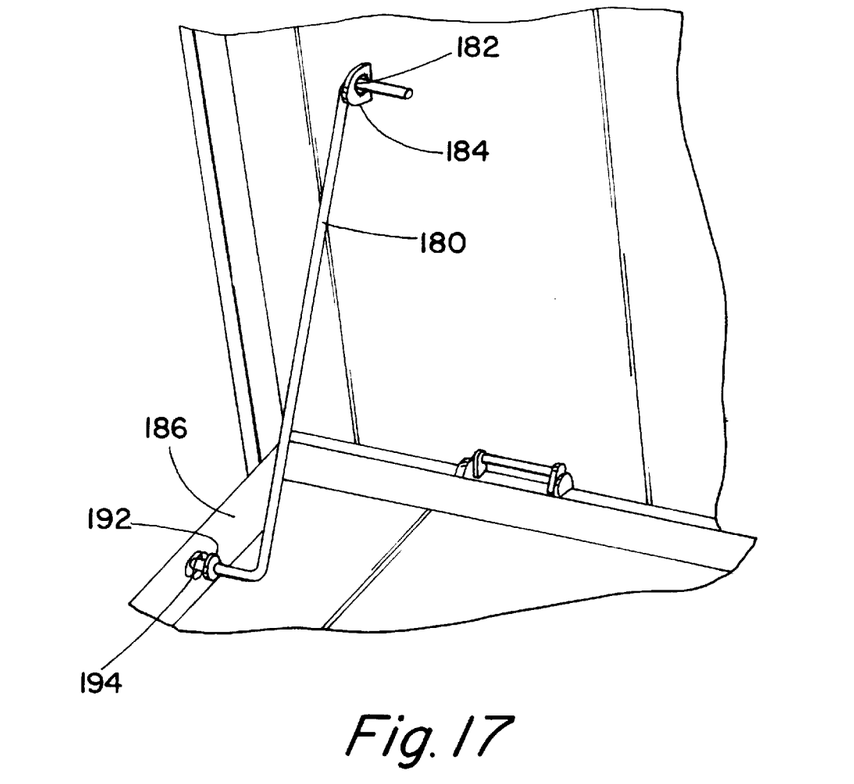
FIG. 17 is a partial perspective view of the switchgear of FIGS. 1–16 illustrating a panel holder arrangement.
Figure 18:
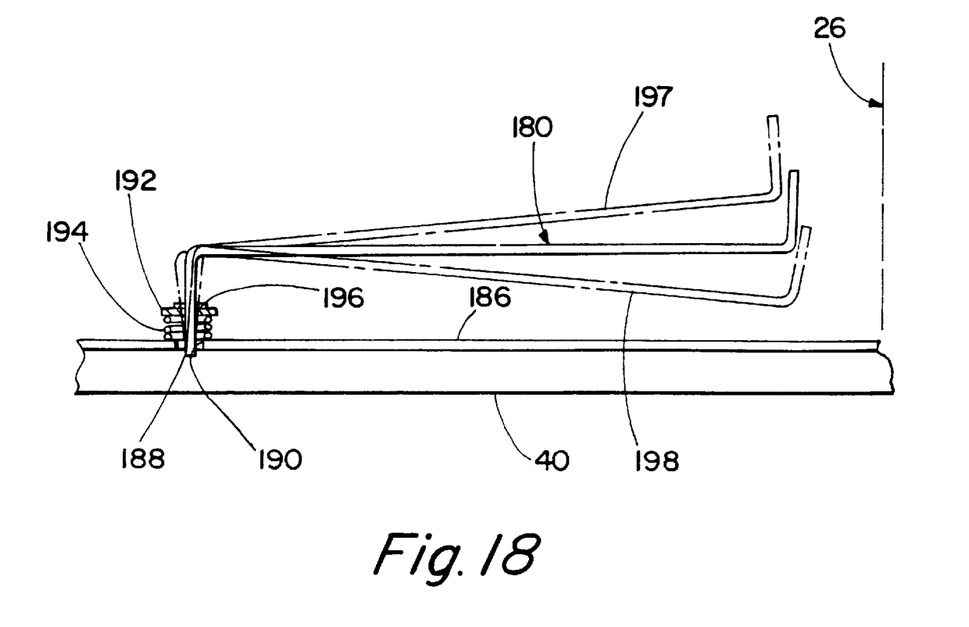
FIG. 18 is top plan view of FIG. 17.

Referring again now to FIG. 2 and additionally to FIGS. 17 and 18, when the lift-up cover panels 26, 28 are lifted to an open position, a holder rod 180 is inserted into an aperture 182 (FIG. 17) of a bracket 184 carried on the inside of the panel 26, 28. The storage position of the holder rod 180 is shown in FIG. 2 as 180'. As best seen in FIG. 17, the holder rod 180 is pivotally carried with respect to the upstanding flange 186 of the sidewalls 40, 42 for movement between the stored position 180' and the holding position shown in FIGS. 2 and 17. With reference to FIG. 18 and in accordance with important aspects of the present invention, the rod 180 is pivotally carried with respect to the upstanding edge 186 of the sidewall 40, 42 such that an end 188 of the holder rod 180 extends through an aperture 190 in the upstanding edge 186 and a collar 192 retains a spring 194 about the 180 and between the collar 192 and the upstanding edge 186, the collar 192 acting against a shoulder 196 on the rod 180. Thus, the rod 180 via the spring 194 serves to hold the cover panels 26, 28 in a stable position in response to forces such as wind acting against the panels 26, 28. As seen in FIG. 18, the spring 194 resists movement of the holder rod 180 in response to forces on the panels 26, 28 that act to move the holder rod 180 out of the stable position, i.e. forces acting on the panels 26, 28 to tend to move the panels 26, 28 with attendant movement of the holder rod 180 act against the spring 194 which the spring 194 resists. As seen in FIG. 18, movement of the holder rod 180 to the positions referred to at 197 and 198 are resisted since the spring 194 requires forces to be exerted thereon for the positions 197 and 198.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. An enclosure for pad-mounted installations of switchgear comprising:
    first means for defining opposed sidewalls;
    lift-up cover means pivotally mounted along a rear edge with respect to said first means; and
    removable panel means spanning said opposed sidewalls and having a first edge supported by and interfitting with said first means, said removable panel means further including a second edge that interfits with said lift-up cover means such that said lift up cover means must be lifted away from said removable panel means to release said removable panel means for movement, said first means comprising a first member disposed below said removable panel means that spans said opposed sidewalls and interfits with said first edge of said removable panel means, said first edge comprising an extending flange that is received behind said first member at the interior of said enclosure.

2. The enclosure of claim 1 wherein said removable panel means includes a cross-section in a direction spanning said opposed sidewalls that provides structural rigidity to said enclosure such that access to the interior of said enclosure is unobstructed in the area spanned by said removable panel means.

3. The enclosure of claim 1 wherein said removable panel means and said lift-up cover means include cooperating structure to define a recess under said lift-up cover means that overhangs said second edge of said removable panel means.

4. The enclosure of claim 1 wherein said removable panel means includes an offset along the front surface thereof so as to be recessed along said second edge with respect to a front edge of said lift-up cover means opposite said rear edge.

5. The enclosure of claim 1 wherein said lift-up cover means carries an actuable latch member and said removable panel means comprises means for cooperating to receive and retain said latch member.

6. The enclosure of claim 5 wherein said removable panel means and said first means comprise interfitting/cooperating structure to retain said removable panel means against upward movement toward said lift-up cover means.

7. The enclosure of claim 1 wherein said lift-up cover means is pivotally mounted about a first axis adjacent a first edge of said lift-up cover means, said enclosure further comprising a first member spanning said opposed sidewalls and arranged to cover said first edge.

8. The enclosure of claim 7 wherein said first means further comprises a second member spanning said opposed sidewalls and arranged below said first edge of said lift-up cover means.

9. An enclosure for pad-mounted installations of switchgear comprising:
    first means for defining opposed sidewalls;
    lift-up cover means pivotally mounted with respect to said first means; and
    removable panel means spanning said opposed sidewalls and having a first edge supported by and interfitting with said first means, said removable panel means further including a second edge that interfits with said lift-up cover means such that said lift up cover means must be lifted away from said removable panel means to release said removable panel means for movement, said lift-up cover means carrying an actuable latch member and said removable panel means comprising means for cooperating to receive and retain said latch member, said removable panel means and said first means comprising second means for retaining said removable panel means against upward movement toward said lift-up cover means.

10. The enclosure of claim 9 wherein said second means comprises interfitting/cooperating structure carried by said removable panel means and said first means.

11. The enclosure of claim 9 wherein said second means comprises at least two protuberances carried by a one of said removable panel means or said first means that cooperate with apertures provided by the other of said removable panel means or said first means.

12. The enclosure of claim 11 wherein said second means further comprises selectively operable fastener means.

13. The enclosure of claim 9 wherein said second means comprises selectively operable fastener means.

14. An enclosure for pad-mounted installations of switchgear comprising:
    first means for defining opposed sidewalls;
    lift-up cover means pivotally mounted along a rear edge with respect to said first means; and
    removable panel means spanning said opposed sidewalls and being supported by said first means, said removable panel means including an upper edge that interfits with a front edge of said lift-up cover means such that said lift up cover means must be lifted away from said removable panel means to release said removable panel means for movement, said removable panel means and said lift-up cover means including cooperating structure to define a recess under said lift-up cover means and with respect to said front edge of said lift-up cover means that overhangs said second edge of said removable panel means.

15. The enclosure of claim 14 wherein said lift-up cover means carries an actuable latch member that extends into said recess, said removable panel means comprising means for cooperating to receive and retain said latch member.

* * * * *